US012493951B2

(12) United States Patent
Gong et al.

(10) Patent No.: US 12,493,951 B2
(45) Date of Patent: Dec. 9, 2025

(54) IMAGE PROCESSING METHOD AND APPARATUS, AND COMPUTER DEVICE, STORAGE MEDIUM AND MAPPING SYSTEM

(71) Applicant: SHANGHAI MICROPORT EP MEDTECH CO., LTD., Shanghai (CN)

(72) Inventors: Jingjing Gong, Shanghai (CN); Liuping Shen, Shanghai (CN); Yiyong Sun, Shanghai (CN); Xianfeng Cao, Shanghai (CN)

(73) Assignee: SHANGHAI MICROPORT EP MEDTECH CO., LTD., Shanghai (CN)

( * ) Notice: Subject to any disclaimer, the term of this patent is extended or adjusted under 35 U.S.C. 154(b) by 433 days.

(21) Appl. No.: 18/001,203

(22) PCT Filed: May 6, 2021

(86) PCT No.: PCT/CN2021/091872
§ 371 (c)(1),
(2) Date: Dec. 8, 2022

(87) PCT Pub. No.: WO2022/001358
PCT Pub. Date: Jan. 6, 2022

(65) Prior Publication Data
US 2023/0230230 A1    Jul. 20, 2023

(30) Foreign Application Priority Data
Jun. 30, 2020   (CN) .......................... 202010613242.3

(51) Int. Cl.
G06T 7/00      (2017.01)
A61B 5/00      (2006.01)
(Continued)

(52) U.S. Cl.
CPC .......... *G06T 7/0012* (2013.01); *A61B 5/0035* (2013.01); *A61B 5/0044* (2013.01);
(Continued)

(58) Field of Classification Search
CPC .......... G06T 7/0012; G06T 7/33; G06T 7/55; G06T 7/73; G06T 2207/10072;
(Continued)

(56) References Cited

U.S. PATENT DOCUMENTS

2007/0049817 A1* 3/2007 Preiss .................. A61B 8/5238
                                                           600/407
2011/0230775 A1* 9/2011 Barley .................. A61B 6/503
                                                           600/508
(Continued)

FOREIGN PATENT DOCUMENTS

CN          1981710 A       6/2007
CN        102196768 A       9/2011
(Continued)

OTHER PUBLICATIONS

Ravanelli, Daniele, et al. "A novel skeleton based quantification and 3-D volumetric visualization of left atrium fibrosis using late gadolinium enhancement magnetic resonance imaging." IEEE transactions on medical imaging 33.2 (2013): 566-576. (Year: 2013).*

(Continued)

*Primary Examiner* — Sean D Mattson
(74) *Attorney, Agent, or Firm* — HSML P.C.

(57) ABSTRACT

The present disclosure relates to an image processing method, a storage medium and a mapping system. An imageological image including a plurality of tomographic images is acquired. A three-dimensional reconstruction is performed according to the plurality of tomographic images to obtain a three-dimensional image model. The three-dimensional image model includes a three-dimensional (Continued)

myocardial fibrosis region image. A three-dimensional electroanatomic model including a three-dimensional abnormal myocardial tissue image is acquired. Since there is a certain correlation between an abnormal myocardial tissue region in the three-dimensional electroanatomic model and myocardial fibrosis, the three-dimensional image model and the three-dimensional electroanatomic model are registered, and an overlapping part of the three-dimensional myocardial fibrosis region image and the three-dimensional abnormal myocardial tissue image is determined as the location of a lesion. Therefore, the accurate positioning of a lesion location is realized, which effectively improves the surgery success rate.

16 Claims, 7 Drawing Sheets

(51) Int. Cl.
    *A61B 5/367*     (2021.01)
    *G06T 7/33*     (2017.01)
    *G06T 7/55*     (2017.01)
    *A61B 5/055*     (2006.01)
    *A61B 6/50*     (2024.01)

(52) U.S. Cl.
    CPC ............... *A61B 5/367* (2021.01); *G06T 7/33* (2017.01); *G06T 7/55* (2017.01); *A61B 5/055* (2013.01); *A61B 6/503* (2013.01); *G06T 2207/10072* (2013.01); *G06T 2207/30048* (2013.01)

(58) Field of Classification Search
    CPC ........ G06T 2207/30048; A61B 5/0035; A61B 5/0044; A61B 5/367; A61B 5/055; A61B 5/1075; A61B 5/0036; A61B 5/743; A61B 5/6852; A61B 5/7203; A61B 5/1073; A61B 6/503; A61B 2576/023; G16H 30/40; G16H 20/40
    See application file for complete search history.

(56) References Cited

U.S. PATENT DOCUMENTS

2016/0292863 A1* 10/2016 Chen .................... G06T 7/33
2021/0137384 A1* 5/2021 Robinson ............... A61B 5/361

FOREIGN PATENT DOCUMENTS

| CN | 102543044 | A |   | 7/2012 |
| CN | 104899886 | A |   | 9/2015 |
| CN | 105078514 | A |   | 11/2015 |
| CN | 105243657 | A |   | 1/2016 |
| CN | 106691438 | A |   | 5/2017 |
| CN | 106780572 | A | * | 5/2017 |
| CN | 108629845 | A |   | 10/2018 |
| CN | 110706336 | A |   | 1/2020 |
| EP | 3184036 | A1 |   | 6/2017 |
| WO | 2019118640 | A1 |   | 6/2019 |

OTHER PUBLICATIONS

Zhang, X-S. et al., "Interactive 3-dimensional registration of standalone F-FDG whole-body PET with CT in the thorax," Chin J Nucl Med, Dec. 2004, vol. 24, No. 6, pp. 361-362 (3 pages) (with English abstract).

Koutalas, E. et al., "Contemporary Mapping Techniques of Complex Cardiac Arrhythmias—Identifying and Modifying the Arrhythmogenic Substrate," Arrhythmia & Electrophysiology Review, 2015, 4(1), pp. 19-27.

Lee, J. et al., "Left atrial imaging and registration of fibrosis with conduction voltages using LGE-MRI and electroanatomical mapping," Computers in Biology and Medicine 111 (2019) 103341, 10 pages.

Khurram, I. M., et al., "Magnetic resonance image intensity ratio, a normalized measure to enable interpatient comparability of left atrial fibrosis," Heart Rhythm, vol. 11, No. 1, Jan. 2014, pp. 85-92.

First Office Action issued for Chinese Patent Application No. 202010613242.3, dated Apr. 3, 2024, 16 pages including English machine translation.

Extended European Search Report issued for European Patent Application No. 21832037.2, dated May 24, 2024, 12 pages.

Zhang, X-Y. et al., "Three-Dimensional Reconstruction on CT Heart Images," Journal of Chongqing University of Technology (Natural Science), vol. 30, No. 12, Dec. 2016, pp. 102-107 (with English abstract).

International Search Report issued for International Patent Application No. PCT/CN2021/091872, Date of mailing: Aug. 11, 2021, 4 pages including English translation.

Written Opinion issued for International Patent Application No. PCT/CN2021/091872, Date of mailing: Aug. 11, 2021, 5 pages including partial English machine translation.

* cited by examiner

IMAGE PROCESSING METHOD AND APPARATUS, AND COMPUTER DEVICE, STORAGE MEDIUM AND MAPPING SYSTEM

CROSS-REFERENCE TO RELATED APPLICATIONS

This application is a national stage application of PCT international application PCT/CN2021/091872 filed on May 6, 2021, which claims priority to Chinese patent application No. 2020106132423 filed with the Chinese Patent Office on Jun. 30, 2020, entitled "IMAGE PROCESSING METHOD AND APPARATUS, AND COMPUTER DEVICE, STORAGE MEDIUM AND MAPPING SYSTEM". The entire contents of the both applications are incorporated by reference in this application.

TECHNICAL FIELD

This disclosure relates to the medical equipment technology, and in particular, to an image processing method, a storage medium, and a mapping system.

BACKGROUND

In current medical theory, an arrhythmia is often caused by an abnormality in one or more regions of the heart. Catheter ablation is a widely used method to treat the arrhythmia, which is mainly to insert a catheter into the heart by puncturing a vessel under monitoring of an X-ray angiography machine. First, a location of a lesion causing the arrhythmia is determined, and then energy such as radiofrequency, freezing, ultrasound, laser, etc., is released at the location of the lesion to necrotize the tissue to block the abnormal signal conduction path, so as to achieve the treatment purpose.

In traditional technology, a three-dimensional mapping system has been widely used in the field of electrophysiology, and an ablation surgery guided by the three-dimensional mapping system is also recognized as a means of treating the arrhythmia. However, an electroanatomic image in the three-dimensional mapping system may not fully reflect a myocardial activity, resulting in an inaccurate location of the lesion.

SUMMARY

In order to solve the above-mentioned problems, the present disclosure provides an image processing method and device, a computer apparatus, a storage medium and a mapping system capable of accurately locating the location of the lesion.

An image processing method includes:
acquiring an imageological image, the imageological image comprising a plurality of tomographic images;
performing a three-dimensional reconstruction according to the plurality of the tomographic images to obtain a three-dimensional image model, the three-dimensional image model comprising a three-dimensional myocardial fibrosis region image;
acquiring a three-dimensional electroanatomic model, the three-dimensional electroanatomic model comprising a three-dimensional abnormal myocardial tissue image; and
registering the three-dimensional image model and the three-dimensional electroanatomic model, and determining an overlapping portion of the three-dimensional myocardial fibrosis region image and the three-dimensional abnormal myocardial tissue image as a location of a lesion.

One or more of a height, a width, a thickness, a volume, and a surface area of the myocardial fibrosis region are calculated according to the three-dimensional model of the myocardial fibrosis region. According to the one or more of the height, the width, the thickness, the volume, and the surface area of the myocardial fibrosis region, an ablation strategy for reference is generated to guide the doctor in the ablation surgery.

An image processing device includes:
a first acquiring module configured to acquire an imageological image, the imageological image comprising a plurality of tomographic images;
a three-dimensional reconstruction module configured to perform a three-dimensional reconstruction according to the plurality of the tomographic images to obtain a three-dimensional image model, the three-dimensional image model comprising a three-dimensional myocardial fibrosis region image;
a second acquiring module configured to acquire a three-dimensional electroanatomic model, the three-dimensional electroanatomic model comprising a three-dimensional abnormal myocardial tissue image; and
an image registering module configured to register the three-dimensional image model and the three-dimensional electroanatomic mode, and determine an overlapping portion of the three-dimensional myocardial fibrosis region image and the abnormal myocardial tissue image as a location of a lesion.

A mapping system includes:
a mapping module configured to acquire three-dimensional positioning signals from a catheter, construct a three-dimensional model of a heart cavity according to the three-dimensional positioning signals, and generate a three-dimensional electroanatomic model by superimposing collected electrophysiological information of mapping points on the three-dimensional model of the heart cavity;
an image processing module configured to perform steps of the image processing method according to any one of above embodiments; and
a display module configured to display the three-dimensional electroanatomic model, the three-dimensional myocardial fibrosis region image, and a registration of the three-dimensional electroanatomic model and the three-dimensional image model.

A computer apparatus includes a memory and a processor, a program is stored in the memory, and when executing the program, the processor implements steps of the method according to any one of the above embodiments.

A non-transitory computer-readable storage medium, on which a computer program is stored, when the computer program is executed by a processor, steps of the method according to any one of the above embodiments.

DETAILED DESCRIPTION OF THE EMBODIMENTS

Figure 1:
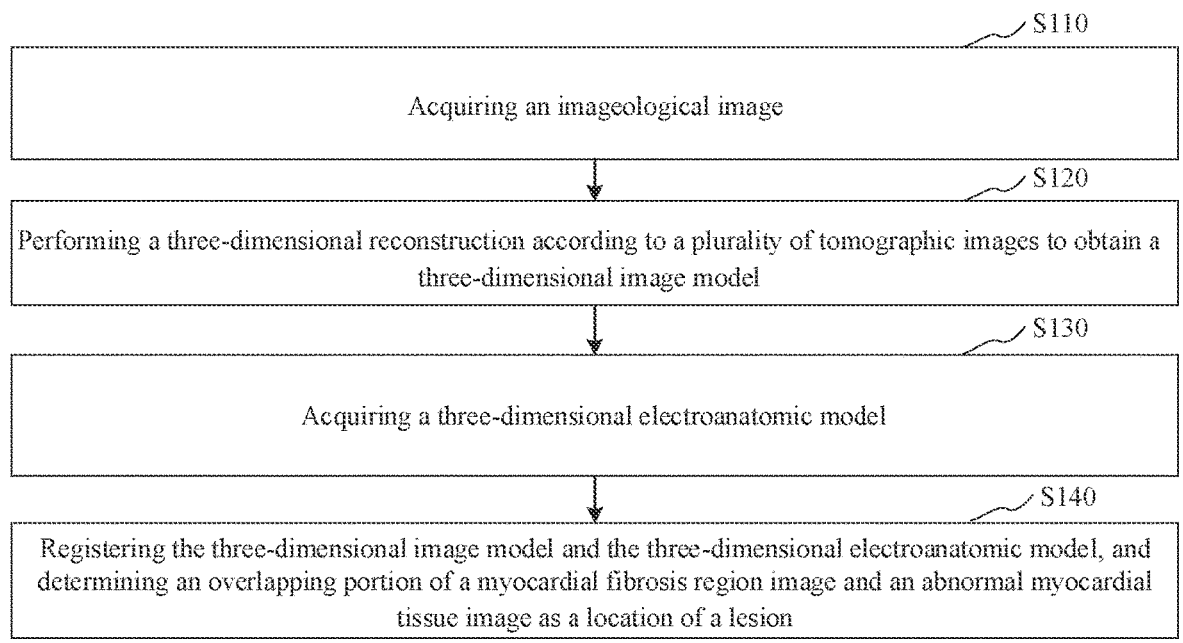
FIG. 1 is a schematic flowchart of an image processing method according to an embodiment.

In order to make the objects, technical solutions and advantages of the present disclosure more clear, the present disclosure will be further described in detail below with reference to the accompanying drawings and embodiments. It should be understood that the specific embodiments described herein are only used to explain the present disclosure, but not to limit the present disclosure.

The arrhythmia refers to an abnormality in the normal rhythm of the heart. The arrhythmia faster than a normal heart rate (60 to 100 beats per minute) is a tachyarrhythmia. Clinically, it is mainly manifested as palpitation, chest tightness, fatigue, dizziness, etc. In severe cases, chest pain, dyspnea, loss of consciousness, and even cerebral stroke may occur. Catheter ablation is a widely used method to treat the arrhythmia, which is mainly to insert a catheter into the heart by puncturing the vessel under a monitoring of an X-ray angiography machine. First, the location of the lesion causing the arrhythmia is determined. Then, the energy such as radiofrequency, freezing, ultrasound, laser, etc. is released at the location of the lesion to necrotize the tissue to block the abnormal signal conduction path, so as to achieve the purpose of treatment.

A circumferential pulmonary vein isolation guided by the three-dimensional mapping system is a recognized method for the treatment of a non-persistent atrial fibrillation. Although new ablation techniques such as the radiofrequency ablation based on pressure catheter and the cryoablation based on balloon catheter, etc. have been developed in recent years, a success rate of the ablation surgery is still low and the recurrence rate after the surgery is still high due to the fact that a mechanism of the arrhythmia is unknown and the location of the lesion is difficult to determine. Studies have shown that more than 80% of atrial fibrillation recurrences are due to an incomplete pulmonary vein isolation which still leads to existence of electrical signal conduction between the pulmonary vein and the left atrium. Some other studies suggest that the recurrences of the atrial fibrillation may be related to myocardial fibrosis.

The myocardial fibrosis is a result of persistent or repeatedly aggravated myocardial ischemia and hypoxia caused by moderate or severe atherosclerotic stenosis of coronary arteries. As the heart increases in size and weight, all heart cavities dilate. A thickness of the heart wall may be normal, but there may be multifocal white fibrosis streaks or strips, and even transmural scarring, or the endocardium may be thickened and lose its normal luster, and sometimes mural thrombi may be present. The myocardial fibrosis manifests clinically as arrhythmia or heart failure. Although clinical myocardial biopsy can identify myocardial fibrosis, it is invasive and a diagnostic area is limited. An imaging examination such as a Magnetic Resonance Imaging (MRI), a Computed Tomography (CT), or a Positron emission tomography (PET) is noninvasive. The MRI has advantages of accurate positioning, wide range, high accuracy and noninvasive in the examination of the myocardial fibrosis. Recent studies have found that a late gadolinium enhancement magnetic resonance imaging (LGE-MRI) can be used to examine a degree of the myocardial fibrosis, an extent and a shape of the fibrosis tissue, and is a relatively direct method for determining myocardial fibrosis.

In traditional techniques, on one hand, the imaging diagnosis is usually used to formulate an ablation strategy before an ablation surgery, and to evaluate an effect of the ablation surgery. On the other hand, a mapping image recorded by the three-dimensional mapping system may not fully reflect myocardial activities due to the influence of factors such as catheter attachment, individual differences such as anatomical structure variation, fat coverage, etc. Therefore, the present disclosure creatively combines imageological images with the mapping images to accurately locate the lesion to guide ablation surgeries.

In an embodiment, as shown in FIG. 1, an image processing method is provided. The image processing method includes the following steps.

At step S110, an imageological image is acquired.

The imageological image may be any of a CT image, a PET image, an MRI image, or an LGE-MRI image. The imageological image includes a plurality of tomographic images. The tomographic images may accurately present the fibrosis of the myocardial tissue, such as a degree of fibrosis, an extent and a shape of the fibrosis tissue. In detail, the imageological image may be stored locally in a computer in advance. The imageological image may be acquired by loading by an image importing module.

At step S120, a three-dimensional reconstruction is performed according to the plurality of tomographic images to obtain a three-dimensional image model.

The three-dimensional reconstruction can be used for a process of creating a mathematical model of myocardial tissue which is suitable for computer representation and processing. The mathematical model obtained by the three-dimensional reconstruction is a basis for processing, operating and analyzing the property of the myocardial tissue in a computer environment, and is also a key technique for representing the myocardial tissue or the heart cavity portion in the computer environment. Myocardial fibrosis region is a result of persistent or repeatedly aggravated myocardial ischemia and hypoxia caused by moderate or severe atherosclerotic stenosis of the coronary arteries. In detail, the imageological image is imported into the three-dimensional mapping system, and the three-dimensional reconstruction is performed to the imageological image by the three-dimensional mapping system. Since the imageological image contains the myocardial fibrosis region, the three-dimensional model obtained by the three-dimensional reconstructed can display the myocardial fibrosis region. Therefore the three-dimensional image model is obtained, and the three-dimensional image model includes a three-dimensional myocardial fibrosis region image. Furthermore, different colors may be used to identify the normal region and the fibrosis region to visually display the quantity, the location, and the extent of the myocardial fibrosis region.

At step S130, a three-dimensional electroanatomic model is acquired.

The three-dimensional mapping is a mapping technique that uses a catheter to move and record electrocardiogram information, a principle of which is similar to the global positioning system (GPS). The three-dimensional electroanatomic model is a three-dimensional image generated by mapping the myocardium or the heart cavity. A geometric model of the heart cavity (or a three-dimensional anatomical model of the hearty cavity) is constructed by collecting mapping points using a positioning sensor (e.g., magnetic positioning sensor or electrical positioning sensor) on the catheter. Multiple mapping points uniformly distributed in the heart cavity are collected point by point. Electrocardiogram signals are collected by a signal sensor inside the heart cavity. An activation time or a voltage of each mapping point is calculated, marked with different colors and superimposed on the geometric model of the heart cavity to generate the three-dimensional electroanatomic model. The three-dimensional electroanatomic model includes a three-dimensional abnormal myocardial tissue image. The three-dimensional abnormal myocardial tissue image may be a low voltage region and/or a scarred region. In detail, the catheter is closely attached to an inner wall of the heart cavity to map at different locations. By using the catheter location information and the collected electrocardiogram signals, the three-dimensional geometry model of the heart cavity is constructed and superimposed with electrophysiological information to form the three-dimensional electroanatomic model.

For example, different colors may be used to distinguish the normal myocardial region from the abnormal myocardial region. Furthermore, the abnormal myocardial region is further divided into a low voltage region and a scarred region, for example, by colors. Generally, an atrial tissue less than 0.05-0.1 mv and a ventricular tissue less than 0.5 mv may be defined as the scarred region. The low voltage region may be set by a user according to actual situations. By using the three-dimensional electroanatomic model, the activity of local myocardial tissue may be learned, for example, the distribution of the scarred regions may be marked, which may assist in analyzing the mechanisms that form and maintain the arrhythmias.

At step S140, a registration is performed to the three-dimensional image model and the three-dimensional electroanatomic model, and an overlapping portion of the myocardial fibrosis region image and the abnormal myocardial tissue image is determined as the location of the lesion.

The imageological image is usually used as a preoperative diagnosis to initially determine the location and the extent of the myocardial fibrosis. However, not all fibrosis regions are abnormal and need to be ablated although there is a certain correlation between the abnormal myocardial tissue region in the three-dimensional electroanatomic model and the myocardial fibrosis. Therefore, the three-dimensional image model and the three-dimensional electroanatomic model can be registered to more accurately locate the lesion for effective ablation. In detail, the three-dimensional image model is displayed, which may be panned, rotated, scaled, or displayed in other conventional views. Then the three-dimensional image model and the three-dimensional electroanatomic model are registered. There may be an overlapping portion between the three-dimensional myocardial fibrosis region image in the three-dimensional image model and the three-dimensional abnormal myocardial tissue image in the three-dimensional electroanatomic model, and the overlapping portion is determined as the location of the lesion.

In the above image processing method, by acquiring the imageological image which includes the plurality of the tomographic images, performing the three-dimensional reconstruction according to the plurality of the tomographic images to obtain the three-dimensional image model which includes the three-dimensional myocardial fibrosis region image, acquiring the three-dimensional electroanatomic model which includes the three-dimensional abnormal myocardial tissue image, registering the three-dimensional image model and the three-dimensional electroanatomic model since there is a certain correlation between the abnormal myocardial tissue region in the three-dimensional electroanatomic model and the myocardial fibrosis, and determining the overlapping portion of the three-dimensional myocardial fibrosis region image and the three-dimensional abnormal myocardial tissue image as the location of the lesion, a precise positioning of the lesion is achieved, which may effectively improve the success rate of the surgeries, reduce the recurrence rate, shorten the surgery time, and also make the surgery simpler, and shorten a learning period.

Figure 2:
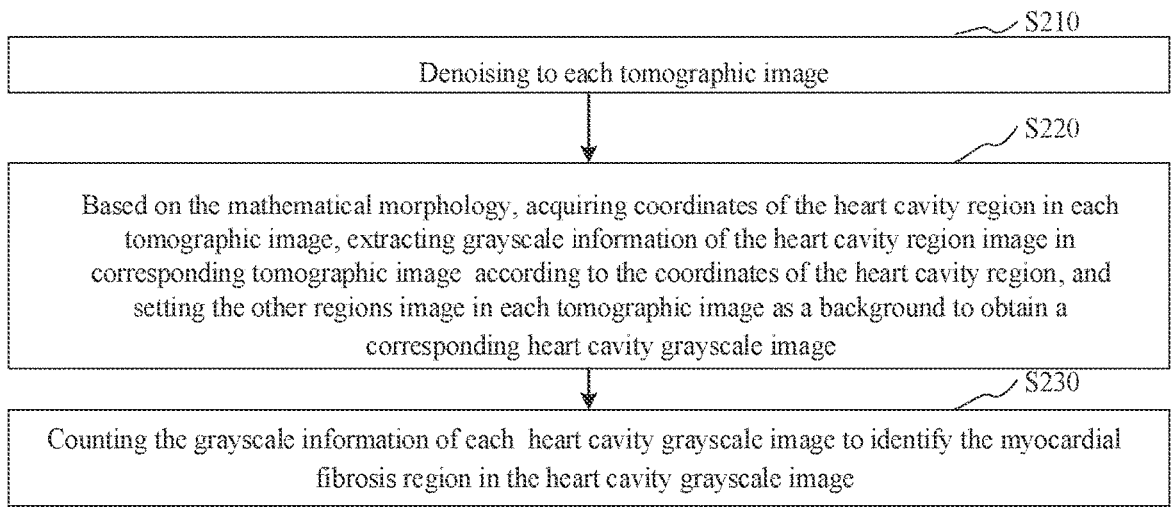
FIG. 2 is a schematic flowchart of an image processing method according to another embodiment.

In an embodiment, the tomographic images include two-dimensional myocardial fibrosis region images. As shown in FIG. 2, before performing the three-dimensional reconstruction according to the plurality of the tomographic images to obtain the three-dimensional image model, the method further includes the following steps.

At step S210, a denoising process is performed to each tomographic image.

The denoising process refers to a process of reducing noise in the tomographic images. In detail, on the one hand, in addition to the heart cavity region, the tomographic images also include an image of remaining region such as the torso and the ribs. The remaining region's images in the tomographic images are removed as a noise. On the other hand, the tomographic images may also include some regions with low pixels or blurred, so that the tomographic images may be denoised according to some filtering principles.

At step S220, based on the mathematical morphology, coordinates of the heart cavity region are acquired in each tomographic image, and grayscale information of the heart cavity region image in corresponding tomographic image is extracted according to the coordinates of the heart cavity region, and the remaining region's image in each tomographic image are set as a background to obtain a corresponding heart cavity grayscale image.

A basic idea of the mathematical morphology is to use structural elements with certain shapes to measure and extract corresponding shapes in an image for the purpose of image analysis and recognition, which may simplify the image data, keep basic shape properties of the image and remove irrelevant structures. The mathematical morphology consists of a group of morphology algebraic operators. Basic operations include expansion (or dilation), erosion, opening and closing, etc. The hearty cavity grayscale images include grayscale information of the myocardial tissue region, while the remaining region in the heart cavity grayscale images other than the heart is set to a same grayscale value or a same color, i.e., the remaining region is set as the background.

In detail, the coordinates of the heart cavity region in the imageological image are obtained, and based on the operations of the mathematical morphology, the grayscale information of the heart cavity region image is obtained by extracting the grayscale distribution features of the imageological image according to the coordinates of the heart cavity region. In order to only keep the heart cavity region in the image, the remaining region in each tomographic image is set as the background, so as to obtain the heart cavity grayscale image.

At step S230, the grayscale information of each heart cavity grayscale image is counted to identify the myocardial fibrosis region in the heart cavity grayscale image.

It is further necessary to distinguish the fibrosis region and the non-fibrosis region from the heart cavity grayscale images after the heart cavity grayscale images are obtained by extracting the features of the heart region from the imageological image. In detail, the grayscale information of the heart cavity grayscale images is counted. The region having high grayscale values refers to the myocardial fibrosis region in the heart cavity grayscale images, and the region having low grayscale values refers to the myocardial non-fibrosis region in the heart cavity grayscale images. Then, the denoising processes based on different filtering principles are performed to identify the myocardial fibrosis region in the heart cavity grayscale images.

In the embodiment, by performing the operations such as denoising, morphological processing and image grayscale information counting on each tomographic image, the myocardial fibrosis region in the heart cavity grayscale images is identified, which provides a basis for later image segmentation and reconstruction of the three-dimensional image model. Accurate identification the myocardial fibrosis region is benefit to establish the three-dimensional model better fits actual situations, and further improves the accuracy of the positioning of the lesion.

Figure 3A:
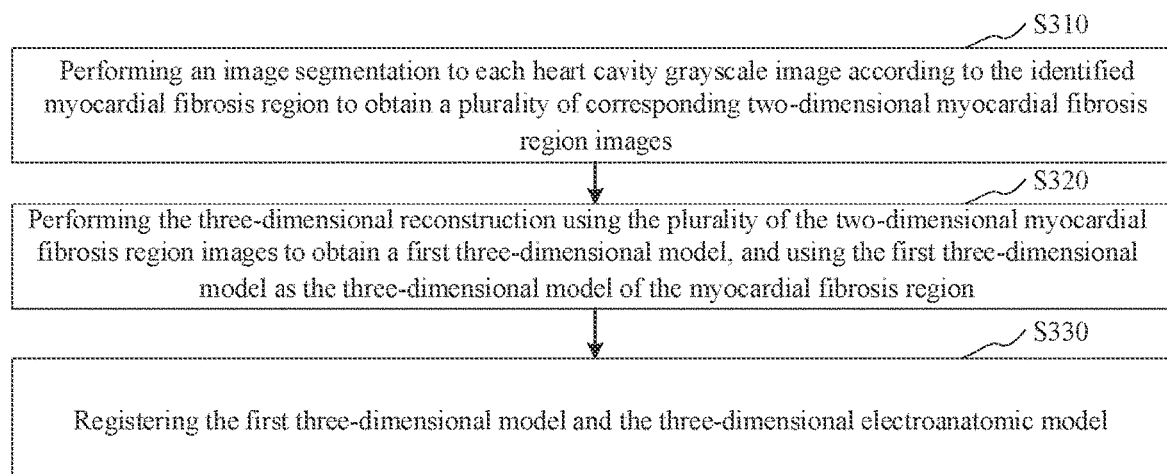
FIG. 3a is a schematic flowchart of an image processing method according to another embodiment.

In an embodiment, as shown in FIG. 3a, the step of performing the three-dimensional reconstruction according to the plurality of the tomographic images to obtain the three-dimensional image model includes the following steps.

At step S310, an image segmentation is performed to each heart cavity grayscale image according to the identified myocardial fibrosis region to obtain a plurality of corresponding two-dimensional myocardial fibrosis region images.

At step S320, the three-dimensional reconstruction is performed using the plurality of the two-dimensional myocardial fibrosis region images to obtain a first three-dimensional model, and the first three-dimensional model is used as the three-dimensional model of the myocardial fibrosis region.

The step of registering the three-dimensional image model and the three-dimensional electroanatomic model includes the following step.

At step S330, the first three-dimensional model and the three-dimensional electroanatomic model are registered.

Figure 3B:
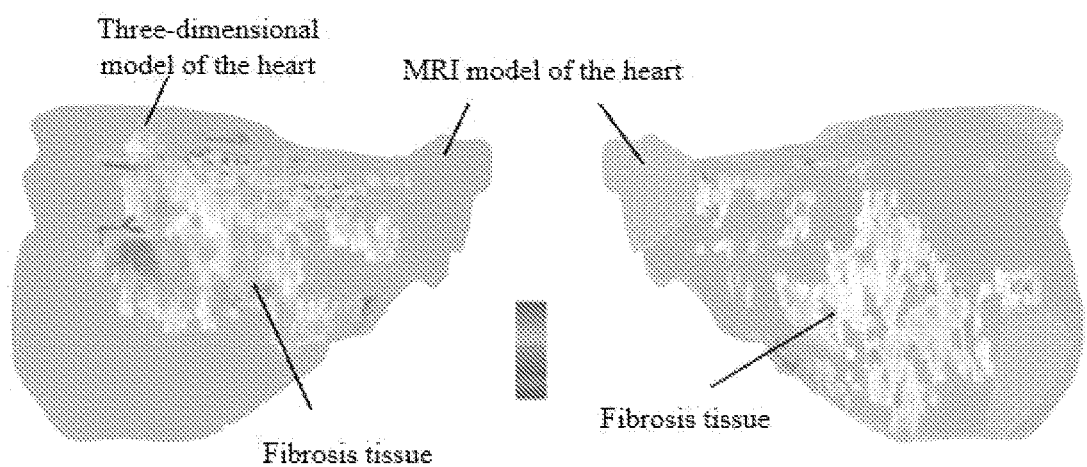
FIG. 3b is a schematic diagram of a myocardial fibrosis region according to an embodiment.

The image segmentation is to extract features from a preprocessed image. In detail, a segmentation algorithm may be designed to determine whether there is a certain degree of fibrosis within a predetermined range by using a measure of spatial distribution complexity of the tissue such as density, clustering, etc., so as to distinguish the fibrosis region and the non-fibrosis region, and to produce images based on the fibrosis tissue features. The colors may represent the degree of fibrosis. The image segmentation algorithm may be a LevelSet segmentation, a GraphCuts segmentation, a watershed segmentation based on morphological transformation, a region growing segmentation, etc. In detail, each heart cavity grayscale image is segmented by an image segmentation module to obtain the corresponding two-dimensional myocardial fibrosis region images. The three-dimensional reconstruction is performed to the two-dimensional myocardial fibrosis region images obtained by the image segmentation, and the plurality of the two-dimensional myocardial fibrosis region images are reconstructed into the three-dimensional model of the myocardial fibrosis region. The three-dimensional model can visually represent the three-dimensional structure of the myocardial fibrosis tissue. The three-dimensional model of the myocardial fibrosis region and the three-dimensional electroanatomic model are registered, and the overlapping portion may be determined as the location of the lesion if there is the overlapping portion between the three-dimensional myocardial fibrosis region image in the three-dimensional model of the myocardial fibrosis region and the three-dimensional abnormal myocardial tissue image in the three-dimensional electroanatomic model. Furthermore, as shown in FIG. 3b, the mottled regions are fibrosis tissues, and the grayscale uniform regions are normal tissues. It should be understood that different colors may be used to identify the normal tissues and the fibrosis tissues to visually show the quantity, the location, and the extent of the myocardial fibrosis region.

Figure 4:
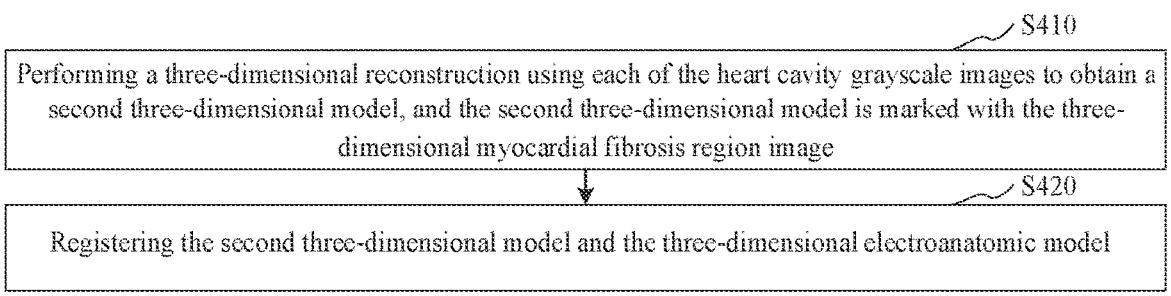
FIG. 4 is a schematic flowchart of an image processing method according to another embodiment.

In an embodiment, as shown in FIG. 4, performing the three-dimensional reconstruction according to the plurality of the tomographic images to obtain the three-dimensional image model includes the following step. At step S410, a three-dimensional reconstruction is performed using each heart cavity grayscale image to obtain a second three-dimensional model, and the second three-dimensional model is marked with the three-dimensional myocardial fibrosis region image.

The step of registering the three-dimensional image model and the three-dimensional electroanatomic model includes the following step. At step S420, the second three-dimensional model and the three-dimensional electroanatomic model are registered.

The second three-dimensional model is a three-dimensional model of the entire heart cavity. In detail, the imageological image is obtained by scanning the thoracic of a human body. The imageological image includes a plurality of tomographic images. The heart cavity grayscale images are obtained by performing the operations such as the denoising, the morphological processing and the extraction of the image grayscale distribution feature to the tomographic images. First, the three-dimensional reconstruction is performed using the processed heart cavity grayscale images to obtain the second three-dimensional model, and the myocardial fibrosis region image may be marked on the second three-dimensional model since the myocardial fibrosis region have been identified in the heart cavity grayscale images The constructed second three-dimensional model and the three-dimensional electroanatomic model are registered, and the overlapping portion may be determined as the location of the lesion if there is the overlapping portion between the three-dimensional myocardial fibrosis region image in the second three-dimensional model and the three-dimensional abnormal myocardial tissue image in the three-dimensional electroanatomic model.

Furthermore, in order to determine whether the three-dimensional image model and the three-dimensional electroanatomic model are appropriately matched to each other, an average registration error, a maximum registration error, and a minimum registration error between the three-dimensional image model and the three-dimensional electroanatomic model may also be calculated to measure the matching degree for each region.

Figure 5:
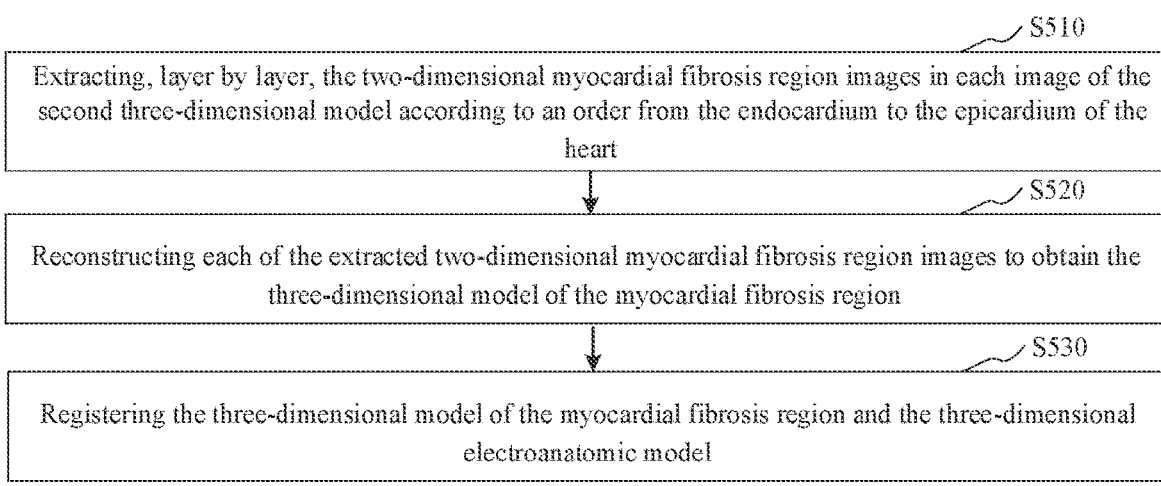
FIG. 5 is a schematic flowchart of an image processing method according to another embodiment.

In an embodiment, as shown in FIG. 5, the method further includes the following steps.

At step S510, the two-dimensional myocardial fibrosis region images in each image of the second three-dimensional model are extracted layer by layer according to an order from the endocardium to the epicardium of the heart.

At step S520, a three-dimensional is performed to each of the extracted two-dimensional myocardial fibrosis region images to obtain the three-dimensional model of the myocardial fibrosis region.

At step S530, the three-dimensional model of the myocardial fibrosis region and the three-dimensional electroanatomic model are registered.

In detail, a three-dimensional structure of the myocardial fibrous tissue may be segmented from the second three-dimensional model once the second three-dimensional model is constructed. In detail, the fibrosis extent in each layer of the myocardial tissue may be clearly known by displaying the second three-dimensional layer by layer in the order from the endocardium to the epicardium of the heart. Based on above description, on the one hand, the fibrosis region in each layer of the image may be segmented and extracted individually. On the other hand, a specific fibrosis region may also be selected for individual extraction. For example, seed points may be set to extract the fibrosis region of all layers separately using a region growing algorithm, and then the three-dimensional reconstruction is performed to the fibrosis region of all layers to obtain the three-dimensional model of the myocardial fibrosis region, so that three-dimensional structure of the myocardial fibrous tissue may be visually displayed. Finally, the three-dimensional model of the myocardial fibrosis region and the three-dimensional electroanatomic model are registered, and the overlapping portion may be determined as the location of the lesion if there is an overlapping portion between the three-dimensional myocardial fibrosis region image and the three-dimensional abnormal myocardial tissue image in the three-dimensional electroanatomic model.

In an embodiment, the method may further include a step of calculating one or more of a height, a width, a thickness, a volume, and a surface area of the myocardial fibrosis region according to the three-dimensional model of the myocardial fibrosis region. Furthermore, an ablation strategy for reference is generated according to the one or more of the height, the width, the thickness, the volume, and the surface area of the myocardial fibrosis region.

In detail, based on knowing the degree of fibrosis in each layer of the myocardial tissue, the fibrosis region in each layer of the image is extracted separately, and the three-dimensional reconstruction is performed using the image of the fibrosis region in each layer to obtain the three-dimensional model of the myocardial fibrosis region. A calculation is performed to the three-dimensional model of the myocardial fibrosis region to obtain the parameters such as the height, the width, the thickness, the volume, and the surface area of the myocardial fibrosis region, which may present the degree of the fibrosis more visually to the operator. After knowing the above parameters of the three-dimensional model of the myocardial fibrosis region, in order to further guide the surgery and improve the surgical effect, ablation indication parameters are further determined according to the height, the width, the thickness, the volume, and the surface area of the myocardial fibrosis region, and an ablation strategy is generated for the operators reference. The ablation strategy includes the settings of parameters such as an ablation integral value, an ablation diameter, an ablation depth, a pressure value, a power, a temperature, an impedance, a time, etc. In this embodiment, the ablation strategy provides a more suitable reference for the operator.

In an embodiment, the three-dimensional electroanatomic model includes a three-dimensional activation conduction map and/or a three-dimensional voltage map. Registering the three-dimensional image model and the three-dimensional electroanatomic model includes: registering the three-dimensional image model and the three-dimensional activation conduction map, and/or registering the three-dimensional image model and the three-dimensional voltage map.

The three-dimensional activation conduction map and the three-dimensional voltage map are two different presentation methods that are selected to perform a three-dimensional heart electrophysiology mapping. The three-dimensional activation conduction map reflects conduction paths of the electrophysiology signals, and the three-dimensional voltage map reflects voltage differences between the electrophysiology signals. The three-dimensional image model may be a three-dimensional model of the myocardial fibrosis region. The three-dimensional model of the myocardial fibrosis region and the three-dimensional electroanatomic model are registered. If there is an overlapping portion between the three-dimensional myocardial fibrosis region image in the three-dimensional model of the myocardial fibrosis region and the three-dimensional abnormal myocardial tissue image in the three-dimensional electroanatomic model, the overlapping portion is determined as the location of the lesion. The three-dimensional image model may also be a three-dimensional model of the heart cavity marked with the image of the myocardial fibrosis region (i.e., a three-dimensional model of the entire hearty cavity). The constructed three-dimensional model of the heart cavity and the three-dimensional electroanatomic model are registered. There may be an overlapping portion between the three-dimensional myocardial fibrosis region image in the three-dimensional model of the heart cavity and the three-dimensional abnormal myocardial tissue image in the three-dimensional electroanatomic model, and the overlapping portion may be determined as the location of the lesion.

In this embodiment, since the scarred region, the low voltage region, and the myocardial fibrosis region are different ways to represent the abnormal myocardial region, and they represent the abnormal myocardial region in different views, a combination of the scarred region, the low voltage region, and the myocardial fibrosis region may be more effective and precise in identifying the specific location of the lesion.

Figure 6A:
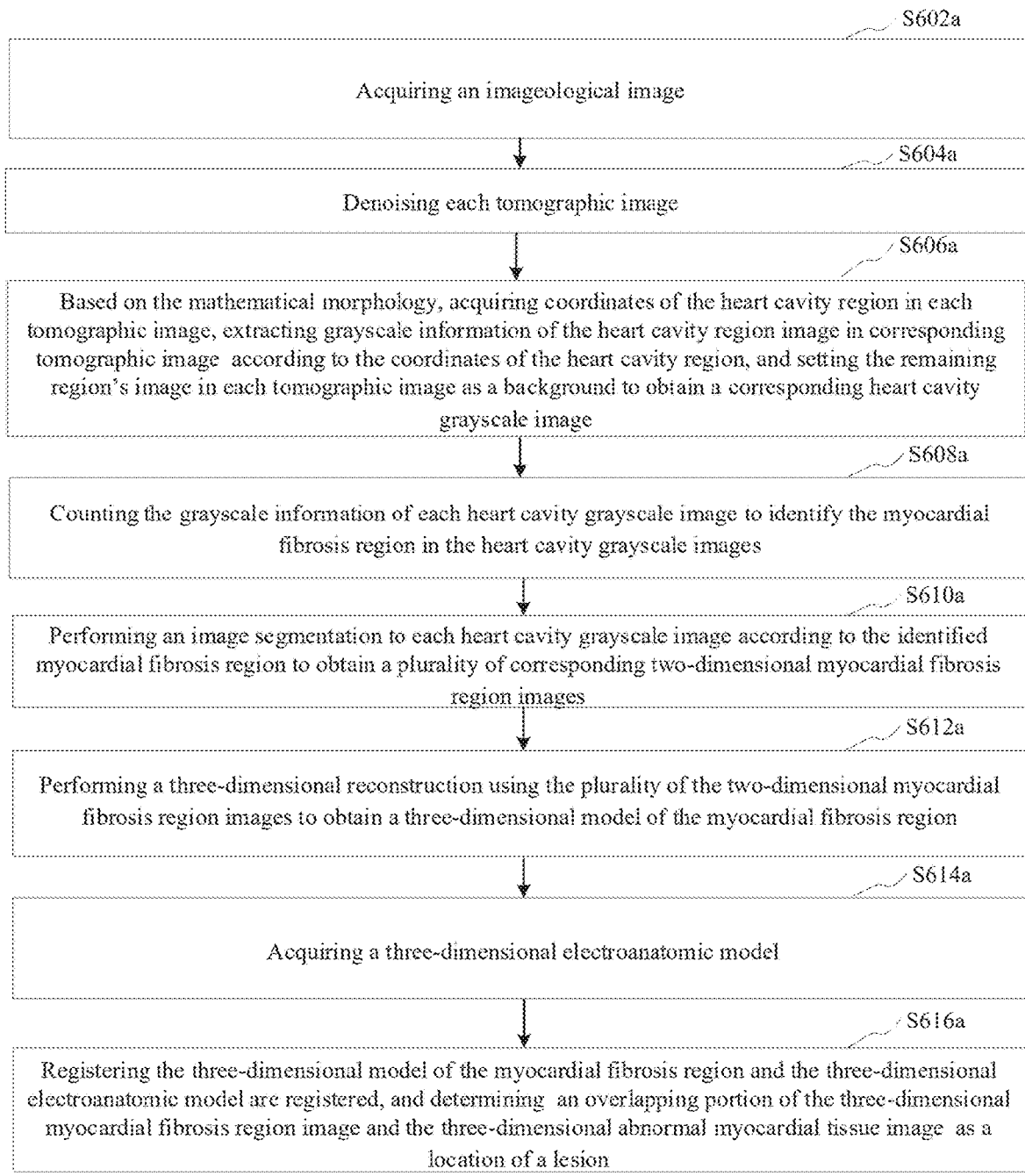
FIG. 6a is a schematic flowchart of an image processing method according to another embodiment.

In an embodiment, the present disclosure provides an image processing method, as shown in FIG. 6, the method includes the following steps.

At step S602a, an imageological image is acquired.

The imageological image includes a plurality of tomographic images, and the tomographic images include two-dimensional myocardial fibrosis region images. In detail, the imageological image may be stored in an image file management module. The image file management module is mainly configured for managing files, loading files and obtaining file information, and storing intermediate files that require pre-processing or other operations. An image import module selects the imageological image from the image file management module, and loads the imageological image to perform a series of processing operations on the imageological image.

At step S604a, a denoising process is performed to each tomographic image.

At step S606a, based on the mathematical morphology, coordinates of the heart cavity region are acquired in each tomographic image, and grayscale information of the heart cavity region image in the corresponding tomographic image is extracted according to the coordinates of the heart cavity region, and the remaining region in each tomographic image is set as a background to obtain a heart cavity grayscale image.

At step S608a, the grayscale information of each heart cavity grayscale image is counted to identify the myocardial fibrosis region in the heart cavity grayscale images.

At step S610a, an image segmentation is performed to each heart cavity grayscale image according to the identified myocardial fibrosis region to obtain a plurality of corresponding two-dimensional myocardial fibrosis region images.

At step 612a, a three-dimensional reconstruction is performed using the plurality of the two-dimensional myocardial fibrosis region images to obtain a three-dimensional model of the myocardial fibrosis region.

The three-dimensional model of the myocardial fibrosis region includes the three-dimensional myocardial fibrosis region image.

At step 614a, a three-dimensional electroanatomic model is acquired.

The three-dimensional electroanatomic model includes a three-dimensional abnormal myocardial tissue image.

At step S616a, the three-dimensional model of the myocardial fibrosis region and the three-dimensional electroanatomic model are registered, and an overlapping portion of the three-dimensional myocardial fibrosis region image and the three-dimensional abnormal myocardial tissue image is determined as the location of a lesion.

Figure 6B:
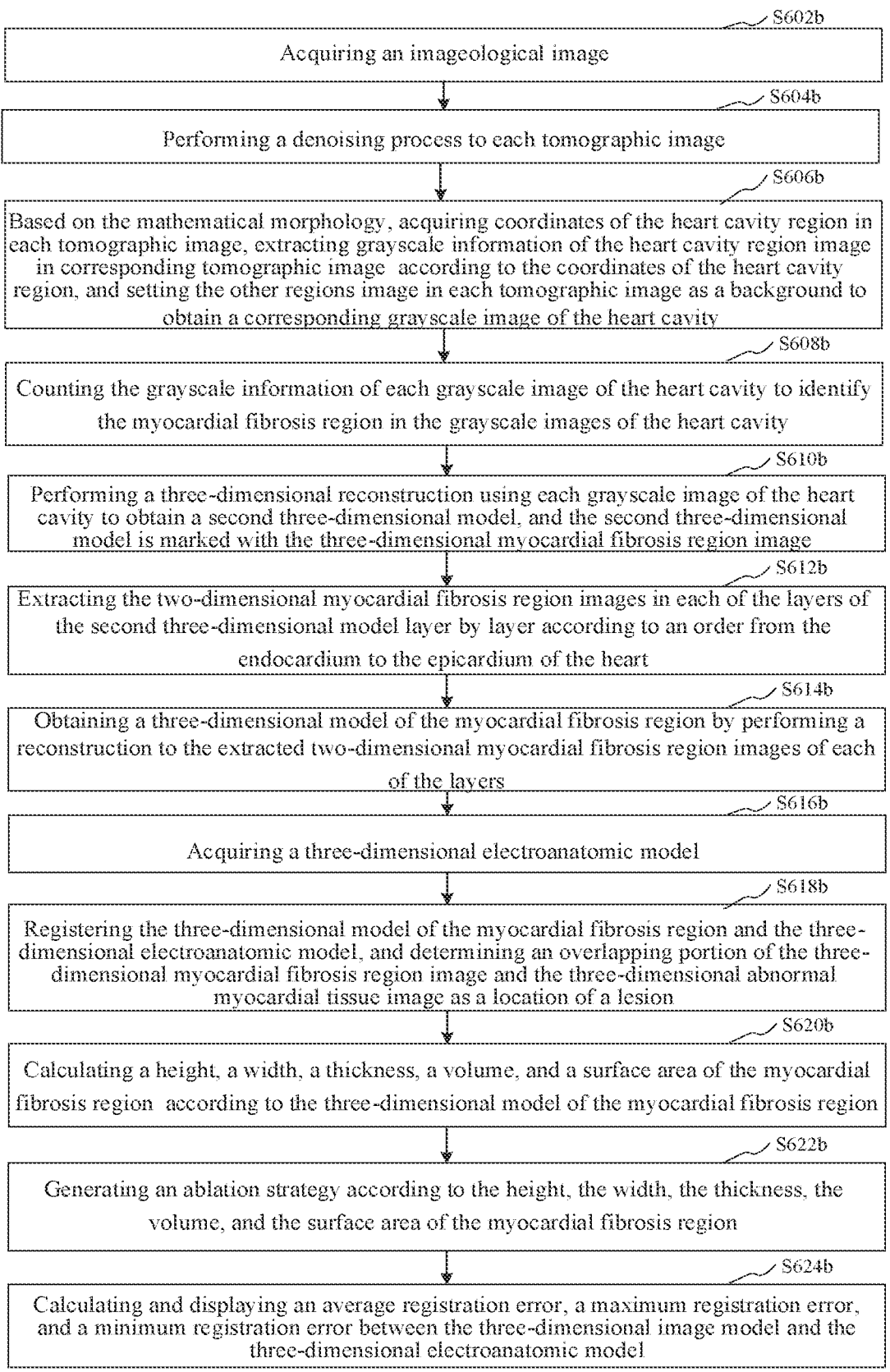
FIG. 6b is a schematic flowchart of an image processing method according to another embodiment.

In an embodiment, the present disclosure provides an image processing method, as shown in FIG. 6b, the method includes the following steps.

At step S602b, an imageological image is acquired.

The imageological images includes a plurality of tomographic images, and the tomographic images include two-dimensional myocardial fibrosis region images.

At step S604b, a denoising process is performed to each tomographic image.

At step S606b, based on the mathematical morphology, coordinates of the heart cavity region are acquired in each tomographic image, and grayscale information of the heart cavity region image in the corresponding tomographic image is extracted according to the coordinates of the heart cavity region, and the remaining region in each tomographic image is set as a background to obtain a heart cavity grayscale image.

At step S608b, the grayscale information of each heart cavity grayscale image is counted to identify the myocardial fibrosis region in the heart cavity grayscale images.

At step S610b, a three-dimensional reconstruction is performed using each heart cavity grayscale image to obtain a second three-dimensional model, and the second three-dimensional model is marked with the three-dimensional myocardial fibrosis region image.

At step S612b, the two-dimensional myocardial fibrosis region images in each image of the second three-dimensional model are extracted layer by layer according to an order from the endocardium to the epicardium of the heart.

At step S614b, a reconstruction is performed to each of the extracted two-dimensional myocardial fibrosis region images to obtain a three-dimensional model of the myocardial fibrosis region.

At step S616b, a three-dimensional electroanatomic model is acquired.

The three-dimensional electroanatomic model includes a three-dimensional abnormal myocardial tissue image. The three-dimensional electroanatomic model includes a three-dimensional activation conduction map and/or a three-dimensional voltage map.

At step S618b, the three-dimensional model of the myocardial fibrosis region and the three-dimensional electroanatomic model are registered, and an overlapping portion of the three-dimensional myocardial fibrosis region image and the three-dimensional abnormal myocardial tissue image is determined as a location of a lesion.

At step S620b, a height, a width, a thickness, a volume, and a surface area of the myocardial fibrosis region are calculated according to the three-dimensional model of the myocardial fibrosis region.

At step S622b, an ablation strategy is generated according to the height, the width, the thickness, the volume, and the surface area of the myocardial fibrosis region.

At step S624b, an average registration error, a maximum registration error, and a minimum registration error between the three-dimensional image model and the three-dimensional electroanatomic model are calculated and displayed.

It should be understood that, although the steps in the flowcharts involved in the above embodiments are sequentially shown by the indications of the arrows, these steps are not necessarily executed in the order indicated by the arrows. Unless explicitly stated herein, the execution of these steps is not strictly limited to the order, and the steps may be executed in other orders. Moreover, at least a part of the steps in the flowcharts involved in the above embodiments may include multiple steps or multiple stages, and these steps or stages are not necessarily executed and completed at the same time, but may be performed at different times. The execution order of these steps or stages is not necessarily sequential, but may be performed alternately or in turn with other steps or at least a part of the steps or stages of the other steps.

Figure 6C:
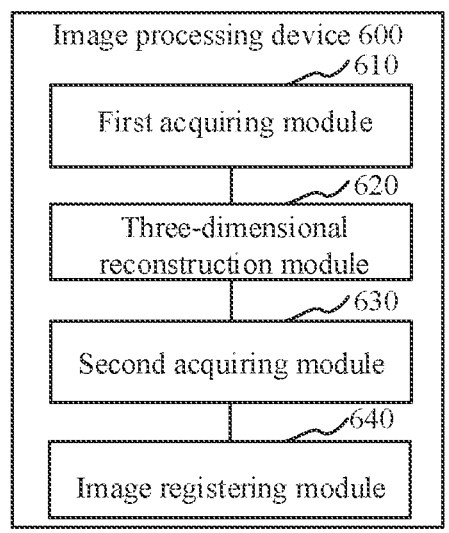
FIG. 6c is a block diagram of a structure of an image processing apparatus according to an embodiment.

In an embodiment, as shown in FIG. 6c, an image processing device is provided. The image processing device includes a first acquiring module 610, a three-dimensional reconstruction module 620, a second acquiring module 630, and an image registering module 640.

The first acquiring module 610 is configured to acquire an imageological image, the imageological image includes a plurality of tomographic images.

The three-dimensional reconstruction module 620 is configured to perform a three-dimensional reconstruction according to the plurality of the tomographic images to obtain a three-dimensional image model. The three-dimensional image model includes a three-dimensional myocardial fibrosis region image.

The second acquiring module 630 is configured to acquire a three-dimensional electroanatomic model. The three-dimensional electroanatomic model includes a three-dimensional abnormal myocardial tissue image.

The image registering module 640 is configured to register the three-dimensional image model and the three-dimensional electroanatomic model, and determine an overlapping portion of the three-dimensional myocardial fibrosis region image and the abnormal myocardial tissue image as a location of a lesion.

In an embodiment, the tomographic images include two-dimensional myocardial fibrosis region images. The device further includes:

a denoising processing module configured to denoise each of the tomographic images;

a first extraction module configured to obtain, based on the mathematical morphology, coordinates of the heart cavity region in each tomographic image, extract grayscale information of the heart cavity region image in corresponding tomographic image based on the heart cavity region coordinates, and set the remaining region's image in each tomographic image as a background to obtain a heart cavity grayscale image; and a fibrosis identification module configured to count the grayscale information of each heart cavity grayscale image and identify the myocardial fibrosis region in the heart cavity grayscale images.

In an embodiment, the three-dimensional reconstruction module 620 is further configured to perform an image segmentation to each heart cavity grayscale image, separately, according to the identified myocardial fibrosis region to obtain a plurality of corresponding two-dimensional myocardial fibrosis region images, and perform a three-dimensional reconstruction using the plurality of the two-dimensional myocardial fibrosis region images to obtain a first three-dimensional model. The first three-dimensional model is used as the three-dimensional model of the myocardial fibrosis region.

The image registering module 640 is further configured to perform a registration to the first three-dimensional model and the three-dimensional electroanatomic model.

In an embodiment, the three-dimensional reconstruction module 620 is further configured to perform a three-dimensional reconstruction using each of the heart cavity grayscale images to obtain a second three-dimensional model. The second three-dimensional model is a three-dimensional model of the entire heart cavity, and the second three-dimensional model is marked with the three-dimensional myocardial fibrosis region.

The image registering module 640 is further configured to perform the registration to the second three-dimensional model and the three-dimensional electroanatomic model.

In an embodiment, the second acquiring module 630 is further configured to extract, layer by layer, two-dimensional myocardial fibrosis region images in each image of the second three-dimensional model according to an order from the endocardium to the epicardium of the heart. The three-dimensional model reconstruction module 620 is configured to reconstruct each of the extracted two-dimensional myocardial fibrosis region images to obtain the three-dimensional model of the myocardial fibrosis region.

The image registering module 640 is further configured to perform the registration to the three-dimensional model of the myocardial fibrosis region and the three-dimensional electroanatomic model.

In an embodiment, the device further includes a first calculating module configured to calculate one or more of a height, a width, a thickness, a volume, and a surface area of the myocardial fibrosis region according to the three-dimensional model of the myocardial fibrosis region.

In an embodiment, the device further includes an ablation strategy generating module configured to generate an ablation strategy for reference according to the height, the width, the thickness, the volume, and the surface area of the myocardial fibrosis region.

In an embodiment, the three-dimensional electroanatomic model includes a three-dimensional activation conduction map and/or a three-dimensional voltage map. The image registering module 640 is further configured to perform the registration to the three-dimensional image model and the three-dimensional activation conduction map, and/or perform the registration to the three-dimensional image model and the three-dimensional voltage map.

In an embodiment, the device further includes a second calculating module configured to calculate an average registration error, a maximum registration error, and a minimum registration error between the three-dimensional image model and the three-dimensional electroanatomic model.

In an embodiment, the three-dimensional activation conduction map reflects conduction paths of the electrophysiology signals, and the three-dimensional voltage map reflects voltage differences between the electrophysiology signals. The normal myocardial tissue region, the low voltage region, and the scarred region are marked in the three-dimensional voltage map. The three-dimensional abnormal myocardial region image includes a low voltage region image and/or a scarred region image.

The specific features of the image processing device may be referred to the above descriptions of the image processing method and will not be repeated here. The modules of the above image processing device may be implemented in whole or in part by software, hardware and combinations thereof. Each of the above modules may be embedded in or independent of the processor in a computer device in a form of hardware, or may be stored in a memory of the computer device in a form of software, so that the processor may be called to perform the operations corresponding to the above modules.

Figure 7:
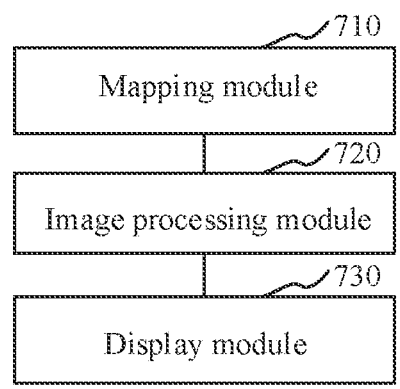
FIG. 7 is a block diagram of modules of a three-dimensional mapping system according to an embodiment.

In an embodiment, the present disclosure provides a three-dimensional mapping system, as shown in FIG. 7, the three-dimensional mapping system includes:

a mapping module 710 configured to acquire three-dimensional positioning signals from a catheter, construct a three-dimensional model of the heart cavity according to the three-dimensional positioning signals, and generate a three-dimensional electroanatomic model by superimposing collected electrophysiological information of mapping points on the three-dimensional model of the heart cavity;

an image processing module 720 configured to perform the steps of the image processing method described in any of the above embodiments; and a display module 730 configured to display the three-dimensional electroanatomic model, the three-dimensional myocardial fibrosis region image, and the registration of the three-dimensional electroanatomic model and the three-dimensional image model.

Figure 8:
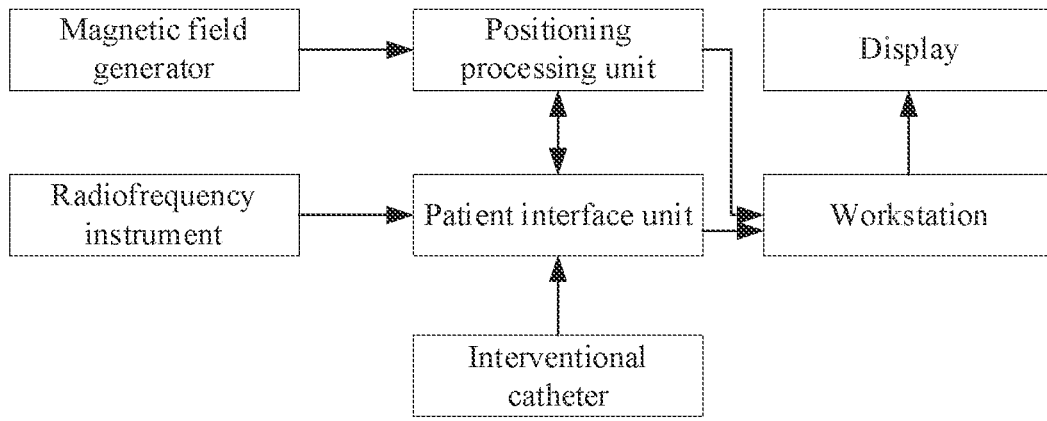
FIG. 8 is a schematic diagram of a structure of a three-dimensional mapping system according to an embodiment.

Exemplarily, the three-dimensional mapping system includes hardware devices and software applications. The hardware devices include an interventional catheter with a positioning sensor, a positioning processing unit, a patient interface unit, a radiofrequency instrument, a workstation, a display, etc. The positioning sensor (magnetic field positioning or electric field positioning) is configured to send and receive positioning signals. As shown in FIG. 8, if the positioning sensor is a magnetic positioning sensor, the three-dimensional mapping system also includes a magnetic field generator. The positioning processing unit is configured to control the operation of the magnetic field generator or an electric field generator, process and analyze positioning information. The patient interface unit is configured to analyze and process the electrophysiological information. The workstation is configured with the software applications, which are configured to summarizes and display all positioning information and the electrophysiological information on the display by software to help the operator better perform the ablation surgery.

Furthermore, the software applications include a system status module, a patient information registration module, a case data management module, an image processing module, and a heart mapping module. The system status module is able to monitor the connection and operation status of the hardware devices in real time. The patient information registration module is configured to record patient-related information such as the name, the gender, the ID and the preliminary medical diagnosis information. The case data management module is configured to manage all case data which are used to case review. The image processing module includes an image file management module, an image segmentation module, a three-dimensional reconstruction module, an image editing module and an image registering module, etc. The heart mapping module is configured to display the catheter in real-time, construct the model of the heart cavity, display the electrophysiological signals in real time and record the related activities, display the images after registration, display the ablation parameters and ablation status, etc. In an embodiment, the heart mapping module may be a data processing unit, such as a central processing unit (CPU), and a graphics processing unit (GPU). The image processing module may be an image signal processor, such as another CPU and GPU of the computer. The display module may be a monitor. The data processing unit and the image signal processor may be two separate processors as described above. In other embodiments, the heart mapping module and the image processing module may be a same processor, for example, a same CPU.

Figure 9:
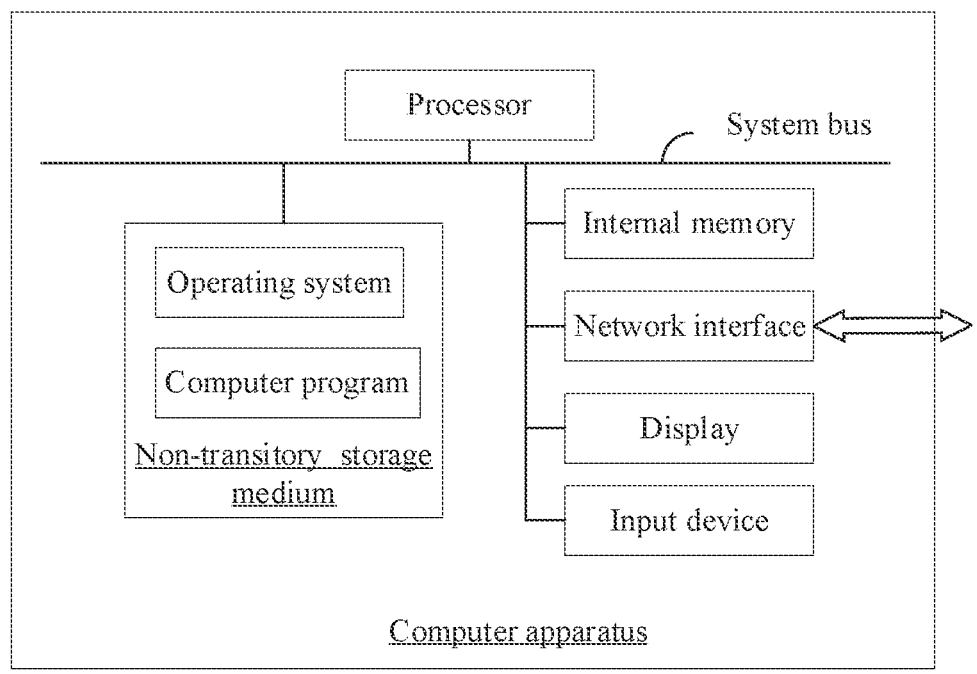
FIG. 9 is a schematic diagram of an internal structure of a computer apparatus according to an embodiment.

In an embodiment, the present disclosure further provides a computer apparatus, which may be a terminal, an inner structure of the computer apparatus is shown in FIG. 9. The computer apparatus includes a processor, a memory, a communication interface, a display screen, and an input device connected via a system bus. The processor of the computer apparatus is configured to provide computing and control capabilities. The memory of the computer apparatus may include a non-transitory storage medium and an internal memory. The non-transitory storage medium stores an operating system and a computer program. The internal memory provides an environment for the operation of the operating system and the computer programs in the non-transitory storage medium. The communication interface of the computer apparatus is configured to be in wired or wireless communication with the external terminals. The wireless communication can be realized by wireless fidelity (Wi-Fi), mobile cellular network, near field communication (NFC) or other technologies. The computer program may be executed by the processor to implement the image processing method. The display screen of the computer apparatus may be a liquid crystal display screen or an electronic ink display screen. The input device of the computer apparatus may be a touch layer covered on the display screen, and may also be keys, trackballs or touchpads provided on the shell of the computer apparatus, and may also be an external keyboard, a touchpad or a mouse.

Those skilled in the art should understand that the structure shown in FIG. 9 is only a block diagram of a part of the structure related to the solution of the present disclosure, and does not constitute a limitation on the computer apparatus to which the solution of the present disclosure is applied. A particular computer apparatus may include more or fewer components, combine certain components, or have a different arrangement of components.

In an embodiment, a computer apparatus is provided. The computer apparatus includes a memory and a processor. A computer program is stored in the memory. The processor implements the following step when executing the computer programs.

An imageological image is acquired, the imageological image includes a plurality of tomographic images. A three-dimensional reconstruction is performed according to the plurality of the tomographic images to obtain a three-dimensional image model, the three-dimensional image model includes a three-dimensional myocardial fibrosis region image. A three-dimensional electroanatomic model is acquired, the three-dimensional electroanatomic model includes a three-dimensional abnormal myocardial tissue image. The three-dimensional image model and the three-dimensional electroanatomic model are registered, and an overlapping portion of the three-dimensional myocardial fibrosis region image and the three-dimensional abnormal myocardial tissue image is determined as a location of a lesion.

In an embodiment, the processor further implements the following steps when executing the computer program. A denoising process is performed to each tomographic image. Based on the mathematical morphology, coordinates of the heart cavity region are acquired in each tomographic image, and grayscale information of the heart cavity region image in the corresponding tomographic image is extracted according to the coordinates of the heart cavity region, and the remaining region in each tomographic image is set as a background to obtain a heart cavity grayscale image. The grayscale information of each heart cavity grayscale image is counted to identify the myocardial fibrosis region in the heart cavity grayscale images.

In an embodiment, the processor further implements the following steps when executing the computer program. An image segmentation is performed to each heart cavity grayscale image according to the identified myocardial fibrosis region to obtain a plurality of corresponding two-dimensional myocardial fibrosis region images. A three-dimensional reconstruction is performed using the plurality of the two-dimensional myocardial fibrosis region images to obtain a first three-dimensional model, and the first three-dimensional model is used as the three-dimensional of the myocardial fibrosis region. The first three-dimensional model and the three-dimensional electroanatomic model are registered.

In an embodiment, the processor further implements the following steps when executing the computer program. A three-dimensional reconstruction is performed using each heart cavity grayscale image to obtain a second three-dimensional model. The second three-dimensional model is a three-dimensional model of the entire heart cavity, and the second three-dimensional model is marked with the myocardial fibrosis region image. The second three-dimensional model and the three-dimensional electroanatomic model are registered.

In an embodiment, the processor further implements the following steps when executing the computer program. Two-dimensional myocardial fibrosis region images in each image of the second three-dimensional model are extracted layer by layer according to an order from the endocardium to the epicardium of the heart. A three-dimensional model of the myocardial fibrosis region is obtained by performing a reconstruction to each of the extracted two-dimensional myocardial fibrosis region images. The three-dimensional model of the myocardial fibrosis region and the three-dimensional electroanatomic model are registered.

In an embodiment, the processor further implements the following step when executing the computer program: a height, a width, a thickness, a volume, and a surface area of the myocardial fibrosis region are calculated according to the three-dimensional model of the myocardial fibrosis region.

In an embodiment, the processor further implements the following step when executing the computer program: an ablation strategy is generated according to the height, the width, the thickness, the volume, and the surface area of the myocardial fibrosis region.

In an embodiment, the three-dimensional electroanatomic model includes a three-dimensional activation conduction map and/or a three-dimensional voltage map. The processor further implements the following step when executing the computer program: the three-dimensional image model and the three-dimensional activation conduction map are registered, and/or the three-dimensional image model and the three-dimensional voltage map are registered.

In an embodiment, the processor further implements the following step when executing the computer program. An average registration error, a maximum registration error, and a minimum registration error between the three-dimensional image model and the three-dimensional electroanatomic model are calculated.

In an embodiment, the present disclosure further provides a non-transitory computer-readable storage medium, the non-transitory computer-readable storage medium stores a computer program, and when the computer program is executed by a processor, the following steps will be implemented.

An imageological image is acquired, the imageological image includes a plurality of tomographic images. A three-dimensional reconstruction is performed according to the plurality of the tomographic images to obtain a three-dimensional image model, the three-dimensional image model includes a three-dimensional myocardial fibrosis region image. A three-dimensional electroanatomic model is acquired, the three-dimensional electroanatomic model includes a three-dimensional abnormal myocardial tissue image. The three-dimensional image model and the three-dimensional electroanatomic model are registered, and an overlapping portion of the three-dimensional myocardial fibrosis region image and the three-dimensional abnormal myocardial tissue image is determined as a location of a lesion.

In an embodiment, when the computer program is executed by the processor, the following steps will be further implemented. A denoising process is performed to each tomographic image. Based on the mathematical morphology, coordinates of the heart cavity region are acquired in each tomographic image, and grayscale information of the heart cavity region image in the corresponding tomographic image is extracted according to the coordinates of the heart cavity region, and the remaining region in each tomographic image is set as a background to obtain a heart cavity grayscale image. The grayscale information of each heart cavity grayscale image is counted to identify the myocardial fibrosis region in the heart cavity grayscale images.

In an embodiment, when the computer program is executed by the processor, the following steps will be further implemented. An image segmentation is performed to each heart cavity grayscale image according to the identified myocardial fibrosis region to obtain a plurality of corresponding two-dimensional myocardial fibrosis region images. A three-dimensional reconstruction is performed using the plurality of the two-dimensional myocardial fibrosis region images to obtain a first three-dimensional model, and the first three-dimensional model is used as the three-dimensional of the myocardial fibrosis region. The first three-dimensional model and the three-dimensional electroanatomic model are registered.

In an embodiment, when the computer program is executed by the processor, the following steps will be further implemented. A three-dimensional reconstruction is performed using each heart cavity grayscale image to obtain a second three-dimensional model. The second three-dimensional model is a three-dimensional model of the entire heart cavity, and the second three-dimensional model is marked with the myocardial fibrosis region image. The second three-dimensional model and the three-dimensional electroanatomic model are registered.

In an embodiment, when the computer program is executed by the processor, the following steps will be further implemented. Two-dimensional myocardial fibrosis region images in each image of the second three-dimensional model are extracted layer by layer according to an order from the endocardium to the epicardium of the heart. A three-dimensional model of the myocardial fibrosis region is obtained by performing a reconstruction to each of the extracted two-dimensional myocardial fibrosis region images. The three-dimensional model of the myocardial fibrosis region and the three-dimensional electroanatomic model are registered.

In an embodiment, when the computer program is executed by the processor, the following step will be further implemented: a height, a width, a thickness, a volume, and a surface area of the myocardial fibrosis region are calculated according to the three-dimensional model of the myocardial fibrosis region.

In an embodiment, when the computer program is executed by the processor, the following step will be further implemented: an ablation strategy is generated according to the height, the width, the thickness, the volume, and the surface area of the myocardial fibrosis region.

In an embodiment, the three-dimensional electroanatomic model includes a three-dimensional activation conduction map and/or a three-dimensional voltage map. When the computer program is executed by the processor, the following step will be further implemented: the three-dimensional image model and the three-dimensional activation conduction map are registered, and/or the three-dimensional image model and the three-dimensional voltage map are registered.

In an embodiment, when the computer program is executed by the processor, the following step will be further implemented: an average registration error, a maximum registration error, and a minimum registration error between the three-dimensional image model and the three-dimensional electroanatomic model are calculated.

Those of ordinary skill in the art can understand that all or part of the processes in the methods of the above embodiments can be implemented by instructing relevant hardware through a computer program, and the computer program can be stored in a non-volatile computer-readable storage medium, when the computer program is executed, it can implement the processes of the above-mentioned method embodiments. Any reference to a memory, a storage, a database or other media used in the embodiments provided in this disclosure may include at least one of a non-volatile and a volatile memory. The non-volatile memory may include read-only memory (ROM), magnetic tape, floppy disk, flash memory, or optical memory and the like. Volatile memory may include random access memory (RAM) or external cache memory. By way of illustration and not limitation, the RAM may be in various forms, such as static random access memory (SRAM) or dynamic random access memory (DRAM).

In the above image processing method, device, computer apparatus, storage medium and mapping system, the imageological image is acquired, the imageological includes the plurality of the tomographic images. The three-dimensional reconstruction is performed according to the plurality of the tomographic images to obtain the three-dimensional image model, the three-dimensional image model includes the three-dimensional myocardial fibrosis region image. The three-dimensional electroanatomic model is acquired, the three-dimensional electroanatomic model includes the three-dimensional abnormal myocardial tissue image. The three-dimensional image model and the three-dimensional electroanatomic model are registered since there is a certain correlation between the abnormal myocardial tissue region in the three-dimensional electroanatomic model and the myocardial fibrosis, and the overlapping portion of the three-dimensional myocardial fibrosis region image and the three-dimensional abnormal myocardial tissue image is determined as the location of the lesion. Therefore, a precise positioning of the lesion is achieved, which may effectively improve the success rate of the surgeries. One or more of the height, the width, the thickness, the volume, and the surface area of the myocardial fibrosis region are calculated and displayed on the three-dimensional mapping system. The ablation strategy is generated according to a relationship between the one or more of the height, the width, the thickness, the volume, and the surface area of the myocardial fibrosis region and ablation indication parameters, an ablation strategy for reference is generated to guide the doctor in the ablation surgery. Therefore, the operator's learning time for operating the system is reduced, which greatly reduces the surgery time, and makes the surgery simpler.

The technical features in the above embodiments may be randomly combined. In order to make the description concise, not all possible combinations of the technical features in the above embodiments are described. However, all the combinations of the technical features are to be considered as falling within the scope described in this specification provided that they do not conflict with each other.

The above-mentioned embodiments only illustrate several embodiments of the present disclosure, and the descriptions thereof are relatively specific and detailed, but should not be construed as a limitation on the scope of the patent of the present disclosure. It should be noted that for those skilled in the art, without departing from the concept of the present disclosure, several modifications and improvements can be made, which all fall within the protection scope of the present disclosure. Therefore, the scope of protection of the present disclosure shall be subject to the appended claims.

What is claimed is:

1. An image processing method, comprising:
    acquiring an imageological image, the imageological image comprising a plurality of tomographic images;
    performing a three-dimensional reconstruction according to the plurality of the tomographic images to obtain a three-dimensional image model, the three-dimensional image model comprising a three-dimensional myocardial fibrosis region image;
    acquiring a three-dimensional electroanatomic model, the three-dimensional electroanatomic model comprising a three-dimensional abnormal myocardial tissue image; and
    registering the three-dimensional image model and the three-dimensional electroanatomic model, and determining an overlapping portion of the three-dimensional myocardial fibrosis region image and the three-dimensional abnormal myocardial tissue image as a location of a lesion;
    wherein the tomographic images comprise a myocardial fibrosis region, before the performing the three-dimensional reconstruction according to the plurality of the tomographic images to obtain the three-dimensional image model, the method further comprises:
    acquiring, based on a mathematical morphology, coordinates of a heart cavity region in each of the tomographic images, extracting grayscale information of a heart cavity region image in a corresponding tomographic image according to the coordinates of the heart cavity region, and setting a remaining region's image in each of the tomographic images as a background to obtain a corresponding heart cavity grayscale image; and
    counting the grayscale information of each of the heart cavity grayscale images to identify the myocardial fibrosis region in the heart cavity grayscale images.

2. The method according to claim 1, wherein before the performing the three-dimensional reconstruction according to the plurality of the tomographic images to obtain the three-dimensional image model, the method further comprises:
    denoising each of the tomographic images.

3. The method according to claim 2, wherein the performing the three-dimensional reconstruction according to the plurality of the tomographic images to obtain the three-dimensional image model comprises:
    performing an image segmentation to each of the heart cavity grayscale images according to the identified myocardial fibrosis region to obtain a plurality of corresponding two-dimensional myocardial fibrosis region images; and
    performing the three-dimensional reconstruction using the plurality of the two-dimensional myocardial fibrosis region images to obtain a first three-dimensional model, wherein the first three-dimensional model is a three-dimensional model of the myocardial fibrosis region.

4. The method according to claim 3, wherein the registering the three-dimensional image model and the three-dimensional electroanatomic model comprises:
    registering the first three-dimensional model and the three-dimensional electroanatomic mode.

5. The method according to claim 3, further comprising:
    calculating one or more of a height, a width, a thickness, a volume, and a surface area of the myocardial fibrosis region according to the three-dimensional model of the myocardial fibrosis region; and
    generating an ablation strategy for reference according to the one or more of the height, the width, the thickness, the volume, and the surface area of the myocardial fibrosis region.

6. The method according to claim 5, wherein the ablation strategy comprises setting at least one of an ablation integral value, an ablation diameter, an ablation depth, a pressure value, a power, a temperature, an impedance, or a time.

7. The method according to claim 2, wherein the performing the three-dimensional reconstruction according to the plurality of the tomographic images to obtain the three-dimensional image model comprises:
    performing the three-dimensional reconstruction using each of the heart cavity grayscale images to obtain a second three-dimensional model, wherein the second three-dimensional model is a three-dimensional model of an entire heart cavity, and is marked with the three-dimensional myocardial fibrosis region image.

8. The method according to claim 7, wherein the registering the three-dimensional image model and the three-dimensional electroanatomic model comprises:

registering the second three-dimensional model and the three-dimensional electroanatomic model.

9. The method according to any one of claim 7, further comprising:
extracting, layer by layer, two-dimensional myocardial fibrosis region images in each image of the second three-dimensional model according to an order from an endocardium to an epicardium of a heart;
performing a reconstruction to each of the extracted two-dimensional myocardial fibrosis region images to obtain a three-dimensional model of the myocardial fibrosis region; and
registering the three-dimensional model of the myocardial fibrosis region and the three-dimensional electroanatomic model.

10. The method according to claim 7, further comprising:
calculating one or more of a height, a width, a thickness, a volume, and a surface area of the myocardial fibrosis region according to the three-dimensional model of the myocardial fibrosis region; and
generating an ablation strategy for reference according to the one or more of the height, the width, the thickness, the volume, and the surface area of the myocardial fibrosis region.

11. The method according to claim 1, wherein the three-dimensional electroanatomic model comprises a three-dimensional activation conduction map and/or a three-dimensional voltage map, the registering the three-dimensional image model and the three-dimensional electroanatomic model comprises:
registering the three-dimensional image model and the three-dimensional activation conduction map; and/or
registering the three-dimensional image model and the three-dimensional voltage map.

12. The method according to claim 11, wherein the three-dimensional activation conduction map reflects conduction paths of electrophysiology signals, and the three-dimensional voltage map reflects voltage differences between the electrophysiology signals, wherein a normal myocardial tissue region, a low voltage region, and a scarred region are marked in the three-dimensional voltage map, and the three-dimensional abnormal myocardial tissue image comprises the low voltage region image and/or the scarred region image.

13. The method according to claim 12, further comprising:
calculating an average registration error, a maximum registration error, and a minimum registration error between the three-dimensional image model and the three-dimensional electroanatomic model.

14. The method according claim 1, wherein the performing the three-dimensional reconstruction according to the plurality of the tomographic images to obtain the three-dimensional image model comprises:
identifying a normal region and a fibrosis region by different colors.

15. A mapping system, comprising:
a mapping module configured to acquire three-dimensional positioning signals from a catheter, construct a three-dimensional model of a heart cavity according to the three-dimensional positioning signals, and generate a three-dimensional electroanatomic model by superimposing collected electrophysiological information of mapping points on the three-dimensional model of the heart cavity;
an image processing module configured to perform steps of:
acquiring an imageological image, the imageological image comprising a plurality of tomographic images;
performing a three-dimensional reconstruction according to the plurality of the tomographic images to obtain a three-dimensional image model, the three-dimensional image model comprising a three-dimensional myocardial fibrosis region image;
acquiring the three-dimensional electroanatomic model, the three-dimensional electroanatomic model comprising a three-dimensional abnormal myocardial tissue image; and
registering the three-dimensional image model and the three-dimensional electroanatomic model, and determining an overlapping portion of the three-dimensional myocardial fibrosis region image and the three-dimensional abnormal myocardial tissue image as a location of a lesion; and
a display module configured to display the three-dimensional electroanatomic model, the three-dimensional myocardial fibrosis region image, and a registration of the three-dimensional electroanatomic model and the three-dimensional image model;
wherein the tomographic images comprise a myocardial fibrosis region and the system further comprises:
a first extraction module, configured to acquire, based on a mathematical morphology, coordinates of a heart cavity region in each of the tomographic images, extract grayscale information of a heart cavity region image in a corresponding tomographic image according to the coordinates of the heart cavity region, and set a remaining region's image in each of the tomographic images as a background to obtain a corresponding heart cavity grayscale image; and
a fibrosis identification module, configured to count the grayscale information of each of the heart cavity grayscale images to identify the myocardial fibrosis region in the heart cavity grayscale images.

16. A non-transitory computer-readable storage medium, on which a computer program is stored, wherein when the computer program is executed by a processor, the following steps are implemented:
acquiring an imageological image, the imageological image comprising a plurality of tomographic images;
performing a three-dimensional reconstruction according to the plurality of the tomographic images to obtain a three-dimensional image model, the three-dimensional image model comprising a three-dimensional myocardial fibrosis region image;
acquiring a three-dimensional electroanatomic model, the three-dimensional electroanatomic model comprising a three-dimensional abnormal myocardial tissue image; and
registering the three-dimensional image model and the three-dimensional electroanatomic model, and determining an overlapping portion of the three-dimensional myocardial fibrosis region image and the three-dimensional abnormal myocardial tissue image as a location of a lesion;
wherein the tomographic images comprise a myocardial fibrosis region, before the performing the three-dimensional reconstruction according to the plurality of the tomographic images to obtain the three-dimensional image model, the method further comprises:
acquiring, based on a mathematical morphology, coordinates of a heart cavity region in each of the tomographic images, extracting grayscale information of a heart cavity region image in the corresponding tomographic image according to the coordinates of the heart cavity region, and setting a remaining region's image in each of the tomographic images as a background to obtain a corresponding heart cavity grayscale image; and counting the grayscale information of each of the heart cavity grayscale images to identify the myocardial fibrosis region in the heart cavity grayscale images.

\* \* \* \* \*